United States Patent Office 3,546,207
Patented Dec. 8, 1970

3,546,207
NEOMYCIN CITRATE
João G. Szyszka, Sao Paulo, Brazil, assignor to E. R. Squibb & Sons, Inc., New York, N.Y., a corporation of Delaware
No Drawing. Filed Jan. 26, 1968, Ser. No. 700,722
Int. Cl. C07c 47/18
U.S. Cl. 260—210                                                    1 Claim

ABSTRACT OF THE DISCLOSURE

This application relates to a novel salt of neomycin, namely, neomycin citrate. This salt has certain unobvious advantages over other salts of neomycin in that it is practically tasteless, it being impossible to detect even an aftertaste upon oral administration.

The neomycin citrate of the invention is an active antibiotic possessing the same spectrum of activity as neomycin sulfate.

In addition, a process is provided for reducing the unpleasant taste as well as the unpleasant aftertaste of neomycin by reacting a neomycin base with citric acid.

---

The present invention provides as a novel and useful composition of matter the citrate salt of neomycin.

Because of the serious toxic properties of parenterally administered neomycin, parenteral use of this drug is not recommended except in those cases of severe infection which have proved unresponsive to other antibiotics, and even then only where the organism has been demonstrated to be sensitive to neomycin in vitro. Thus, the use of neomycin has been limited, for the most part, to oral dosage formulations.

Heretofore, the preparation of oral dosage forms of neomycin, employing as the active ingredient the most readily avialable form, e.g., neomycin sulfate, has been hindered by the fact that neomycin sulfate is extremely unpalatable, possessing a very unpleasant taste as well as a persistently unpleasant aftertaste. Thus, it has been necessary to provide dosage forms in which the unpleasant taste of the sulfate salt is masked or otherwise overcome; for instance, by the use of capsules, coatings, and the like.

It is accordingly an object of this invention to provide a form of neomycin with which oral formulations may be provided without regard to the taste of the active ingredient.

It has been unexpectedly discovered that this object is readily achieved by the provision of the citrate salt of neomycin. This salt has surprisingly been found to be practically tasteless. In addition, this salt possesses no discernible aftertaste.

Neomycin citrate is readily prepared by neutralizing a neomycin base solution with citric acid and precipitating the salt from an aqueous concentrate with methanol, or the like.

The citrate salt of this invention is an active antibiotic possessing the same spectrum of activity as neomycin sulfate. As such, it may be employed in lieu of neomycin sulfate against *M. tuberculosis* and many gram-positive and gram-negative bacteria. It may, for instance, be formulated and administered orally, in the same manner as neomycin sulfate, for reducing bacterial flora of the colon pre-operatively and as an adjunct in the control of diarrheas due to neomycin-sensitive organisms, particularly infectious infantile diarrhea due to *E. coli*. Oral adult dosage for intestinal antisepsis prior to surgery is about 4.5 to about 9 g. daily, divided into three doses and administered for a period of 24 to 72 hours prior to surgery. For the control of diarrhea, the dosage ranges between 15 to 30 mg. per pound of body weight daily, administered in divided doses.

Neomycin citrate is also useful in veterinary medicine for the treatment of systemic, enteric, and reproductive infections as well as local infections of the skin, ear, and eye caused by a wide variety of gram-positive and gram-negative organisms (e.g., *M. tuberculosis*, *S. aureus*, *E. coli*, *K. pneumonial*, *H. influenzal*, *P. vulgaris*, *Ps. aeruginosa*, *A. aerogenes*). It may be administered, for instance, to cattle at a dosage of from 4.0 to 7.5 g. daily in divided doses. In the treatment of bovine mastitis by intramammary infusion, the dosage is about 500 mg. in either 10 to 20 ml. of sterile water or in 3.5 g. of ointment per quarter. It may be administered to colts and calves at a dosage of 2 to 3 g. daily in divided doses, to lambs in a dosage of from 0.75 to 1.0 g. daily in divided doses. or to dogs at a dosage of from 200 to 500 mg. daily in divided doses. Topical formulations may be prepared either in the form of solutions containing 0.1 to 4.0% by weight of neomycin citrate or in an ointment formulation containing about 0.5% of neomycin citrate.

The following example illustrates the preparation of the novel salt of this invention:

EXAMPLE I 500 ml. of neomycin base concentrate is placed under moderate agitation. 200 ml. of a 30% citric acid solution is slowly added to adjust this solution from pH 10.8 to pH 7.0. The solution is pad filtered and the pad washed with distilled water. 690 ml. of the neutral concentrate is then added over a two-hour period to 3 liters of moderately agitated methanol, whereupon a granular solid is formed, separated from the solution by vacuum filtration, washed with methanol and vacuum dried 16 hours at 40° C. to yield 185 g. of a fine granular powder, identified as neomycin citrate [UV Peaks at 232 m$\mu$=0.760 and at 278 m$\mu$=0.940, UV Peak Ratio ($A_{278}/A_{232}$)=1.23].

What is claimed is:

1. A process for producing neomycin in a form which is practically tasteless, which comprises reacting a neomycin base with citric acid to form a neutral concentrate of neomycin citrate and then mixing the concentrate with methanol to form solid neomycin citrate.

References Cited

UNITED STATES PATENTS

| 3,022,286 | 2/1962 | Van de Griendt | 260—210Neo |
| 3,147,245 | 9/1964 | Kunin | 260—210Neo |

LEWIS GOTTS, Primary Examiner

J. R. BROWN, Assistant Examiner

U.S. Cl. X.R.

424—180